US009261296B2

(12) United States Patent
Kayanuma et al.

(10) Patent No.: US 9,261,296 B2
(45) Date of Patent: Feb. 16, 2016

(54) ABSORPTION HEAT PUMP WITH A THERMALLY INSULATING DIVIDING WALL

(75) Inventors: Hidetaka Kayanuma, Wako (JP); Hideyuki Akaba, Wako (JP); Kazuma Ichikawa, Wako (JP); Mitsuru Ishikawa, Wako (JP); Yoshiyuki Takeuchi, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 700 days.

(21) Appl. No.: 12/919,959

(22) PCT Filed: Mar. 18, 2009

(86) PCT No.: PCT/JP2009/056018
§ 371 (c)(1),
(2), (4) Date: Aug. 27, 2010

(87) PCT Pub. No.: WO2009/119695
PCT Pub. Date: Oct. 1, 2009

(65) Prior Publication Data
US 2011/0005253 A1 Jan. 13, 2011

(30) Foreign Application Priority Data

Mar. 27, 2008 (JP) .................................. 2008-084962

(51) Int. Cl.
*F25B 27/00* (2006.01)
*F25B 30/04* (2006.01)
(Continued)

(52) U.S. Cl.
CPC . *F25B 30/04* (2013.01); *F24D 3/08* (2013.01); *F24D 3/18* (2013.01); *F24D 12/02* (2013.01);
(Continued)

(58) Field of Classification Search
CPC . F24D 17/00; F24D 17/0026; F24D 17/0031; F24D 17/0052; F24D 17/0057; F24D 17/0089; F24D 3/08; F25B 30/04
USPC .............................. 62/238.3, 238.1, 476, 477
See application file for complete search history.

(56) References Cited

U.S. PATENT DOCUMENTS 2,178,603 A * 11/1939 Nelson ............................ 62/105
3,418,825 A * 12/1968 Russell .......................... 62/483
(Continued)

FOREIGN PATENT DOCUMENTS

DE     3140003 A1     4/1983
DE     4029995 A1     3/1992
(Continued)

OTHER PUBLICATIONS

Notification of Transmittal of the International Search Report and the Written Opinion of the International Searching Authority, dated Oct. 24, 2012, International Application PCT/JP2009/056018, 11 pages.

*Primary Examiner* — Marc Norman
*Assistant Examiner* — Antonio R Febles
(74) *Attorney, Agent, or Firm* — Rankin, Hill & Clark LLP

(57) ABSTRACT

A boiler-equipped absorption heat pump unit in which a regenerator, a boiler, and other high-temperature devices are separated from an evaporator, an absorber, and other low-temperature devices are separated by an insulated dividing wall. The dividing wall reduces heat loss by impeding the transfer of heat from the high-temperature devices to the low-temperature devices.

4 Claims, 4 Drawing Sheets

(51) Int. Cl.
    *F24D 3/08*     (2006.01)
    *F24D 3/18*     (2006.01)
    *F24D 12/02*     (2006.01)

(52) U.S. Cl.
    CPC ......... *F24D 2200/04* (2013.01); *F24D 2200/12* (2013.01); *F24D 2200/126* (2013.01); *F25B 2339/047* (2013.01); *Y02B 30/12* (2013.01); *Y02B 30/14* (2013.01); *Y02B 30/52* (2013.01)

(56) References Cited

U.S. PATENT DOCUMENTS

| | | | | |
|---|---|---|---|---|
| 3,452,551 | A | * | 7/1969 | Aronson ..................... 62/148 |
| 3,605,432 | A | * | 9/1971 | Wada ........................ 62/324.2 |
| 4,953,361 | A | | 9/1990 | Knoche et al. |
| 5,249,436 | A | * | 10/1993 | Hemsath ..................... 62/476 |
| 5,558,046 | A | * | 9/1996 | Schoppe et al. ............ 122/367.1 |
| 5,901,567 | A | * | 5/1999 | Suzuki et al. ................ 62/324.2 |
| 5,941,089 | A | * | 8/1999 | Takaishi et al. ............. 62/324.2 |
| 2003/0041608 | A1 | * | 3/2003 | Gonzalez-Cruz et al. ... 62/235.1 |
| 2004/0221611 | A1 | * | 11/2004 | Shin et al. ..................... 62/508 |
| 2009/0205346 | A1 | * | 8/2009 | Major et al. .................... 62/118 |
| 2009/0314021 | A1 | * | 12/2009 | Higgs ........................... 62/255 |
| 2011/0314856 | A1 | * | 12/2011 | Willgohs ..................... 62/235.1 |

FOREIGN PATENT DOCUMENTS

| | | | | |
|---|---|---|---|---|
| DE | 296115044 | * | 1/1998 | ............ F23J 11/00 |
| GB | 1 519 522 | | 8/1978 | |
| JP | 59-67772 | | 5/1984 | |
| JP | 05-060419 | | 3/1993 | |
| JP | 11-287528 | * | 3/1999 | ............ F25B 15/00 |
| JP | 11-287528 | | 10/1999 | |
| JP | 2001-091084 | | 4/2001 | |

* cited by examiner

ABSORPTION HEAT PUMP WITH A THERMALLY INSULATING DIVIDING WALL

TECHNICAL FIELD

The present invention relates to an improved absorption heat pump unit equipped with a boiler.

BACKGROUND ART

An absorption heat pump equipped with a boiler for reheating hot water is known from, for example, U.K. Patent No. 1519522.

As disclosed in U.K. Patent No. 1519522, the heat pump comprises: an evaporator for absorbing heat from an external source to evaporate a refrigerant; a compressor for pressurizing the refrigerant, the compressor being connected to the evaporator; a condenser for releasing the heat of the refrigerant to the exterior, the condenser being connected to the compressor; an expansion valve connected between the condenser and the evaporator; and a water supply tube for recovering the heat released to the exterior, the water supply tube being connected to the condenser.

A boiler for reheating hot water as necessary is provided to the water supply tube connected to the condenser. Hot water that has passed through the heat pump is heated by the boiler as necessary, and the heated hot water is used to heat a room or as a hot water source.

However, U.K. Patent 1519522 does not describe the relative positional relationship between devices when devices constituting a heat pump and devices including a boiler are placed inside a case. Additionally, the heat pump is a compression heat pump.

In view of the greater demand to conserve energy in heat pumps and the objective of reducing energy consumption, consideration is being given to the use of absorption heat pumps, in which the amount of energy consumed can be suppressed in comparison with compression heat pumps.

DISCLOSURE OF THE INVENTION

An object of the present invention is to provide a boiler-equipped absorption heat pump unit wherein heat loss can be reduced.

According to the present invention, there is provided an absorption heat pump unit comprising: an evaporator for absorbing heat from an external source and evaporating a refrigerant to create refrigerant vapor; an absorber for absorbing the refrigerant vapor created by the evaporator into an absorbent solution; a regenerator for heating the absorbent solution created in the absorber to separate the refrigerant vapor from the absorbent solution; a condenser for condensing the refrigerant vapor separated in the regenerator and releasing the heat to the exterior; a water supply tube designed to cause water to flow to the absorber and the condenser in order to cool the absorbent solution in the absorber and to recover the heat released to the exterior by the condenser; and a boiler placed in the path of the water supply tube to reheat hot water, wherein the absorption heat pump unit is covered by a case, the interior of the case is divided by a dividing wall into a first chamber and a second chamber; the regenerator, the condenser, and the boiler are disposed in the first chamber, and the evaporator and the absorber are disposed in the second chamber.

Consequently, the regenerator, the boiler, and other high-temperature devices that reach high temperatures, as well as the evaporator, the absorber, and other lower-temperatures devices are separated by the dividing wall, thereby impeding the transfer of heat from the high-temperature devices to the low-temperature devices, and therefore reducing heat loss. The devices can be operated efficiently because heat loss is reduced.

Preferably, the pressure difference between a higher pressure and lower pressure in the heat pump unit is set as a first pressure difference, the pressure difference in the refrigerant resulting from the height difference between a refrigerant outlet of the condenser and a refrigerant inlet of the evaporator is set as a second pressure difference, the pressure difference in the absorbent solution resulting from the height difference between an absorbent solution outlet of the regenerator and an absorbent solution inlet of the absorber is set as a third pressure difference, and the second pressure difference and third pressure difference are designed so as to be less than the first pressure difference.

Thus, the second pressure difference in the refrigerant resulting from the height difference between the refrigerant outlet of the condenser and the refrigerant inlet of the evaporator is reduced to below the first pressure difference, which occurs between the higher pressure and lower pressure in the absorption heat pump unit. Consequently, the absorption heat pump uses the pressure difference between the higher pressure and lower pressure as a drive force to circulate the refrigerant. If the second pressure difference is less than the first pressure difference, the refrigerant can be moved from the condenser to the evaporator without the use of a separate pump or the like, even when the operating load is small and the pressure difference in the absorption heat pump is small.

Furthermore, the third pressure difference in the absorbent solution resulting from the height difference between the absorbent solution outlet in the regenerator and the absorbent solution inlet in the absorber is reduced to below the first pressure difference in the heat pump unit. If the third pressure difference is less than the first pressure difference, the absorbent solution can be moved from the regenerator to the absorber without the use of a separate pump or the like, even when the operating load is small and the pressure difference in the absorption heat pump is small. Consequently, the efficiency of the absorption heat pump unit can be increased.

Preferably, the condenser has a refrigerant inlet and a refrigerant outlet, and the refrigerant inlet and refrigerant outlet are disposed so as to be substantially horizontal. Thus, if the refrigerant inlet and the refrigerant outlet are disposed so as to be substantially horizontal, the pressure difference in the refrigerant resulting from the height difference between the refrigerant outlet in the condenser and the refrigerant inlet in the evaporator can be reduced to less than in a structure in which the refrigerant inlet and refrigerant outlet are disposed so as to be substantially vertical. The refrigerant can then be moved from the refrigerant outlet in the condenser to the refrigerant inlet in the evaporator without the use of a separate pump or the like, even when the operating load is small and the pressure difference in the absorption heat pump is small. Consequently, the efficiency of the heat pump unit can be increased.

In a preferred form, the absorber comprises: a bottom part for accumulating the absorbent solution; a top part for dispersing the absorbent solution; an absorption supply tube for linking the bottom part and the top part together; and a circulation pump for pumping the absorbent solution up to the top part, the circulation pump being located in the path of the absorption supply tube, wherein the absorber further comprises a Venturi part disposed in the path of the absorption supply tube and located on an output side of the circulation pump and a supply tube extending from an absorbent solution outlet formed in the regenerator is connected to the Venturi part, or wherein a supply tube extending from an absorbent solution outlet formed in the regenerator is connected to an intake side of the circulation pump.

Usually, when the absorbent solution is moved from the regenerator to the absorber, it is common for the pressure difference between the regenerator and the absorber to be used. However, there has been the possibility that the pressure difference cannot be used to move the absorbent solution to the absorber in cases in which the operating load of the absorption heat pump is small.

Therefore, the Venturi part is placed in the path of the absorption supply tube linking the bottom part and top part of the absorber together, and the supply tube extending from the absorbent solution outlet formed in the regenerator is connected to the Venturi part, whereby the absorbent solution outputted from the regenerator can be drawn into the Venturi part and easily moved to the absorber. Otherwise, a supply tube extending from the absorbent solution outlet formed in the regenerator is connected to the intake side of the circulation pump, whereby the absorbent solution outputted from the regenerator can be drawn into the intake side of the circulation pump and easily moved to the absorber. The absorbent solution can be moved without the use of a separate pump or the like even in cases of a small operating load, and the efficiency of the absorption heat pump unit can therefore be improved.

Preferably, the regenerator comprises a first heating burner, the boiler comprises a second heating burner whose capacity is greater than the first heating burner, and the first heating burner is disposed below and separate from the second heating burner. Thus, since the second heating burner has a greater capacity than the first heating burner, the exhaust tube of the second heating burner is greater in size than the exhaust tube of the first heating burner. Consequently, if the second heating burner is disposed above the first heating burner, the configuration of the exhaust tubes can be made more compact.

Furthermore, since the first heating burner is disposed below and separate from the second heating burner, localized hot spots are prevented from arising in the high-temperature parts.

BEST MODE FOR CARRYING OUT THE INVENTION

Certain preferred embodiments of the present invention will be described in detail below with reference to the accompanying drawings.

Figure 1:
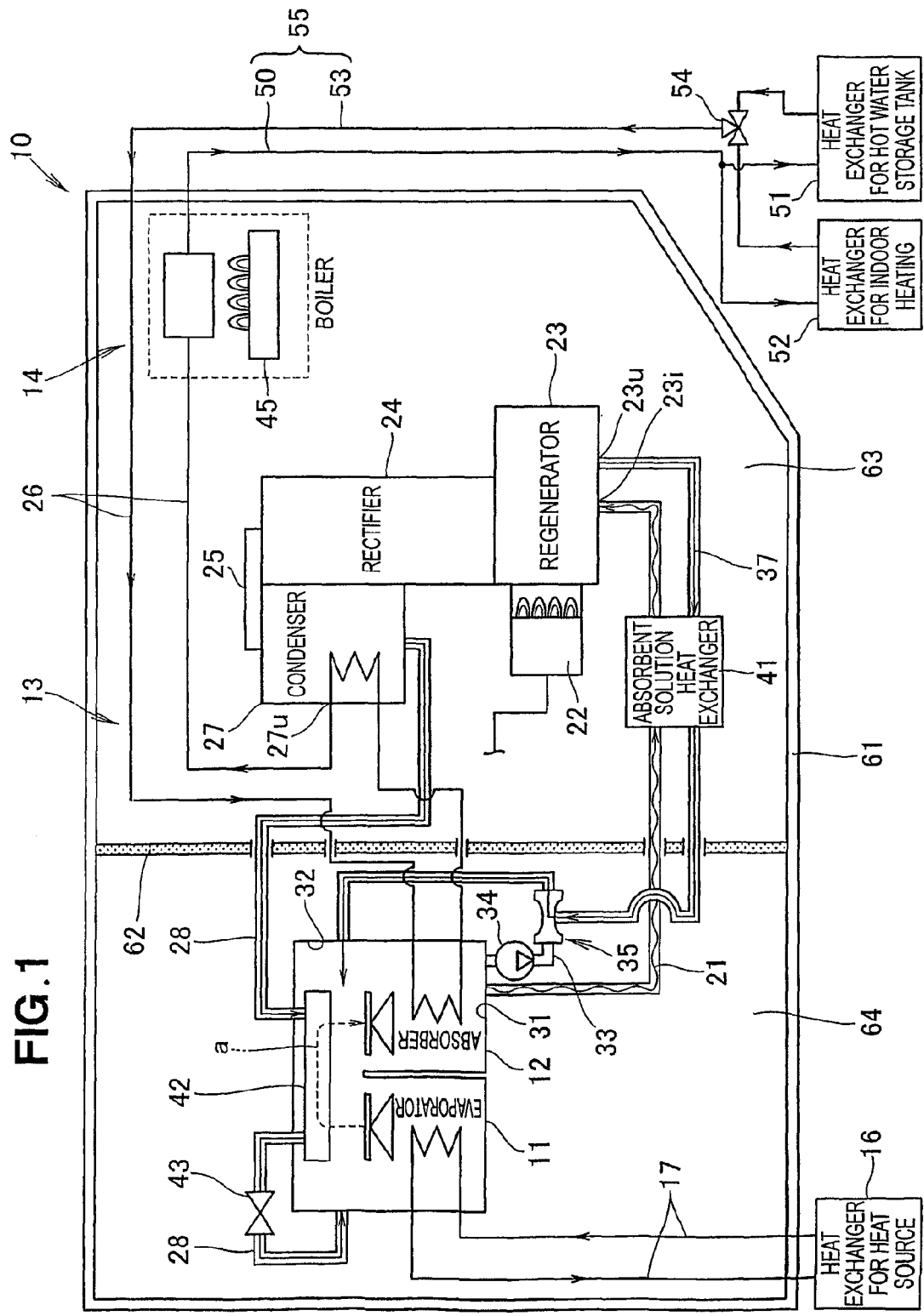
FIG. 1 is a schematic diagram showing the overall configuration of a boiler-equipped absorption heat pump unit according to a first embodiment of the present invention.

Trifluoroethanol (TFE) or another fluoroalcohol is used as the refrigerant in an evaporator 11 shown in FIG. 1, and an absorbent solution containing a DMI derivative (dimethyl imidazolidinone) as an absorbent is used in an absorber 12. In the present invention, the refrigerant and the absorbent solution are not limited to those given above.

An absorption heat pump unit 10 comprises an absorption heat pump 13, and a boiler 14 for reheating hot water obtained by the absorption heat pump 13, the boiler being provided to the absorption heat pump 13.

The absorption heat pump 13 comprises, e.g., a heat exchanger 16 as a heat source for absorbing heat from underground water, outside air, or the like; a cooling water circuit 17 connected to the heat exchanger 16 as a heat source; the evaporator 11 for absorbing heat from an external source via the refrigerant being circulated through the cooling water circuit 17 by a pump (not shown) and evaporating the refrigerant to create refrigerant vapor; the absorber 12 for absorbing the refrigerant vapor created by the evaporator 11 into the absorbent solution; a supply tube 21 for feeding the absorbent solution that has absorbed the refrigerant vapor to a pump (not shown), the supply tube extending from the absorber 12; a regenerator 23 for heating the absorbent solution created by the absorber 12 with a first heating burner 22 to separate the refrigerant vapor from the absorbent solution, the regenerator being connected to the supply tube 21; a rectifier 24 for purifying the refrigerant vapor, the rectifier being provided above the regenerator 23; a rectification supply tube 25 for transmitting the refrigerant vapor from the rectifier 24; a condenser 27 for condensing the refrigerant vapor that has passed through the rectifier 24 and releasing heat to the exterior via the water passing through an internal water supply tube 26, the condenser being connected upstream of the rectification supply tube 25; and a refrigerant supply tube 28 extending from the condenser 27 to the evaporator 11, through which the condensed refrigerant is transmitted. A precooler 42 disposed so as to extend between the evaporator and the absorber, and an expansion valve 43 for reducing the pressure of the refrigerant are disposed in sequence in the path of the refrigerant supply tube 28.

The absorber 12 comprises a bottom part 31 for accumulating the absorbent solution; a top part 32 for dispersing the absorbent solution; an absorption supply tube 33 for linking the bottom part 31 and the top part 32 together; a circulation pump 34 for pumping the absorbent solution up to the top part 32, the circulation pump being located in the path of the absorption supply tube 33; and a Venturi part 35 located in the path of the absorption supply tube 33 and disposed on the output side of the circulation pump 34.

Connected to the Venturi part 35 is a supply tube 37 for transmitting the absorbent solution from which the refrigerant vapor has been separated by the regenerator 23, the supply tube extending from an absorbent solution outlet 23$u$ formed in the regenerator 23. An absorbent solution heat exchanger 41 is located in the paths of both of the supply tubes 21 and 37 for connecting the absorber 12 and the regenerator 23.

The water supply tube 26 is located between the absorber 12 and the condenser 27 in order to cool the absorbent solution in the absorber 12 and to recover the heat released to the exterior by the condenser 27, and water flows through the tube in the stated order. The water is preferably tap water, an aqueous solution of ethylene glycol, or an aqueous solution of propylene glycol.

The boiler 14 is located in the path of the water supply tube 26 on the side near an outlet 27$u$ in the condenser 27, and the boiler reheats the hot water. The boiler 14 comprises a second heating burner 45 having a greater capacity than the first heating burner 22 provided to the regenerator 23.

The evaporator 11 and absorber 12 are connected via a duct (not shown). When a low-pressure environment is maintained inside the evaporator 11 and absorber 12, heat supplied from an external source is absorbed, and the refrigerant inside the evaporator 11 moves in the direction of arrow "a" into the absorber 12. The precooler 42 has the function of lowering the temperature of the TFE supplied from the condenser 27 and heating and vaporizing the refrigerant mist remaining in the refrigerant vapor. The refrigerant vapor is absorbed by the absorbent solution supplied into the absorber 12 by the absorption supply tube 33.

In the regenerator 23, when the first heating burner 22 is ignited, the refrigerant vapor contained in the absorbent solution is separated. The refrigerant vapor increased in purity by the rectifier 24 is moved to the condenser 27 and cooled in the condenser 27, and the condensed, liquefied refrigerant is returned to and dispersed in the evaporator 11 via the expansion valve 43 and the precooler 42.

The water supply tube 26 interposed between the absorber 12, the condenser 27, and the boiler 14 in order to transmit water is connected to a heat exchanger 51 of a hot water storage tank and a heat exchanger 52 for indoor heating by an output supply tube 50, and a return supply tube 53 comprising a pump (not shown) extends to the water supply tube 26 from the heat exchanger 51 of a hot water storage tank and the heat exchanger 52 for indoor heating. A switch valve 54 is placed in the path of the return supply tube 53, and the flow path of a hot water circuit 55 is switched by the switch valve 54. Therefore, the flow path of the hot water circuit 55 is switched to the heat exchanger 52 for indoor heating during heating, and the flow channel of the hot water circuit 55 is switched to the heat exchanger 51 of a hot water storage tank when hot water is being supplied.

Figure 2:
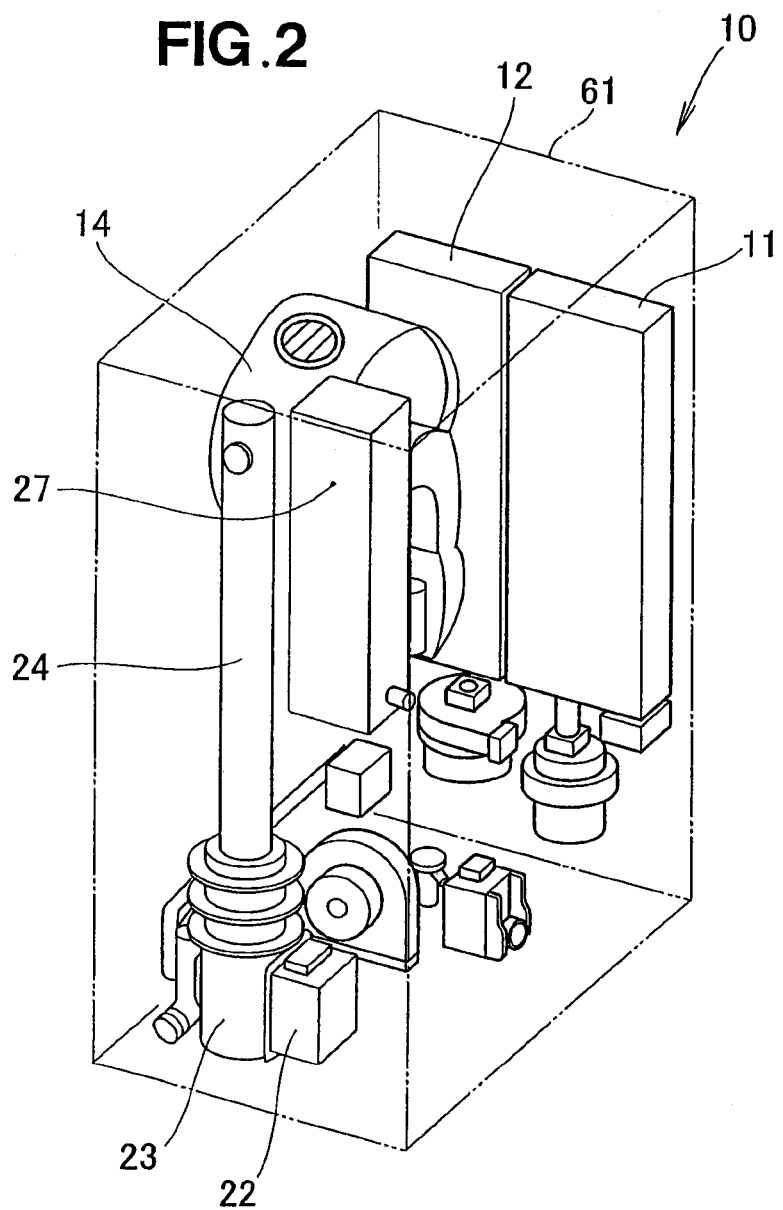
FIG. 2 is a perspective view of the absorption heat pump unit according to the first embodiment.
Figure 3:
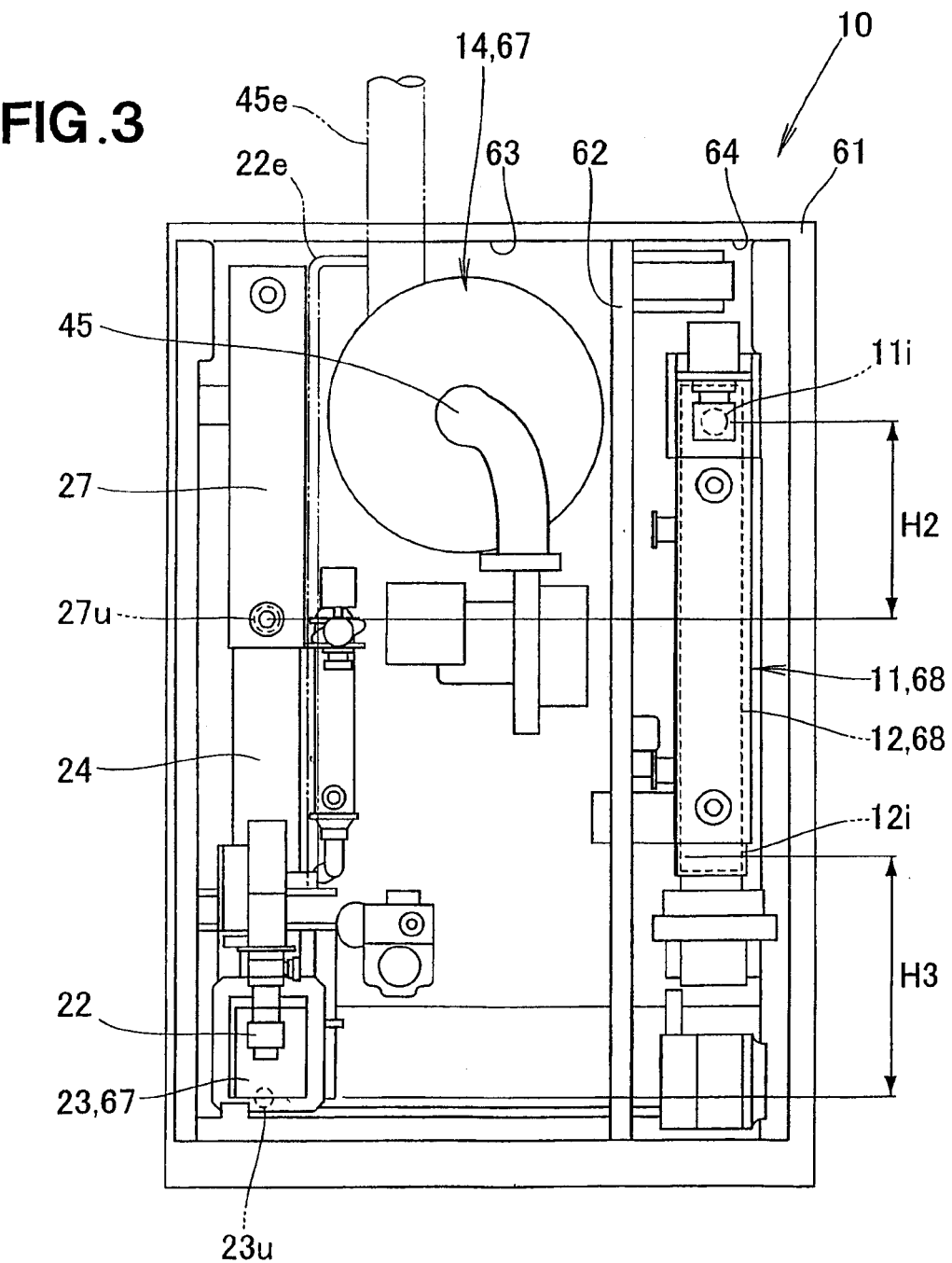
FIG. 3 is a front view of the absorption heat pump unit of FIG. 2.

The absorption heat pump unit 10 is covered by a case 61, as shown in FIGS. 2 and 3. The interior of the case 61 is divided into a first chamber 63 and a second chamber 64 by a dividing wall 62 (see FIGS. 1 and 3). The first chamber 63 comprises the regenerator 23, the rectifier 24 connected to the top of the regenerator 23, the condenser 27 disposed on the top side of the rectifier 24, and the boiler 14 disposed to the side of the condenser 27. The evaporator 11 and the absorber 12 are disposed in alignment in the second chamber 64.

The regenerator 23 comprises the first heating burner 22. The boiler 14 comprises the second heating burner 45, which has a greater capacity than the first heating burner 22. The first heating burner 22 and the second heating burner 45 are both driven using gas as fuel, and the first heating burner 22 is disposed below and separate from the second heating burner 45.

Since the second heating burner 45 has greater capacity than the first heating burner 22, the exhaust tube 45e of the second heating burner 45 is larger than the exhaust tube 22e of the first heating burner 22. The configurations of the exhaust tubes 22e, 45e can be made more compact because the second heating burner 45 is disposed above the first heating burner 22.

Since the first heating burner 22 is disposed below and separate from the second heating burner 45, it is possible to prevent localized hot spots from arising in the high-temperature parts.

Instead of gas, kerosene, or another fuel may be used as the fuel for the first heating burner 22 and the second heating burner 45.

The case 61 can be placed hanging from a wall, standing on a floor, or any other arbitrary placement.

The action of the above-described absorption heat pump unit 10 will now be described.

The interior of the case 61 is divided by the dividing wall 62 into the first chamber 63 and the second chamber 64; the regenerator 23, the condenser 27, and the boiler 14 are disposed in the first chamber 63; and the evaporator 11 and absorber 12 are disposed in the second chamber 64. The regenerator 23, the boiler 14, and other high-temperature devices 67 that reach high temperatures; and the evaporator 11, the absorber 12, and other lower-temperatures devices 68 are separated by the dividing wall 62, thereby impeding the transfer of heat from the high-temperature devices 67 to the low-temperature devices 68, and therefore reducing heat loss. The devices can be operated efficiently because heat loss is reduced.

The following is a description of the pressure differences arising from the arrangement of the absorption heat pump 13 and the structural devices.

The pressure difference between a higher pressure and lower pressure in the absorption heat pump 13 is set as the first pressure difference H1, the pressure difference in the refrigerant resulting from the height difference between the refrigerant outlet 27u of the condenser 27 and the refrigerant inlet 11i of the evaporator 11 is set as the second pressure difference H2 (second head), and the pressure difference in the absorbent solution resulting from the height difference between the absorbent solution outlet 23u of the regenerator 23 and the absorbent solution inlet 12i of the absorber 12 is set as the third pressure difference H3 (third head). The second pressure difference H2 and the third pressure difference 113 are designed so as to be less than the first pressure difference H1.

The absorption heat pump 13 uses the pressure difference between the higher pressure and lower pressure as a drive force to circulate the refrigerant. If the second pressure difference 112 is less than the first pressure difference H1, the refrigerant can be moved from the condenser 27 to the evaporator 11 even when the operating load is small and the pressure difference in the absorption heat pump 13 is small.

If the third pressure difference H3 is less than the first pressure difference H1, the absorbent solution can be moved from the regenerator 23 to the absorber 12 even when the operating load is small and the pressure difference in the absorption heat pump 13 is small.

Therefore, even in cases of a small operating load, the absorbent solution can be transmitted between the absorbent solution outlet 23u of the regenerator 23 and the absorbent solution inlet 12i of the absorber 12 without the use of a pump or the like, and refrigerant can be transmitted between the refrigerant outlet 27u of the condenser 27 and the refrigerant inlet 11i of the evaporator 11.

When the absorbent solution is moved from the regenerator 23 to the absorber 12, it is common for the pressure difference between the regenerator 23 and the absorber 12 to be used. However, there has been the possibility that the pressure difference cannot be used to move the absorbent solution to the absorber 12 in cases in which the operating load of the absorption heat pump 13 is small.

Therefore, a Venturi part 35 is placed in the path of the absorption supply tube 33 linking the bottom part 31 and top part 32 of the absorber 12 together, and the supply tube 37 extending from the absorbent solution outlet 23u formed in the regenerator 23 is connected to the Venturi part 35, whereby the absorbent solution outputted from the regenerator 23 can be drawn into the Venturi part 35 and easily returned to the absorber 12. Therefore, even in cases of a small operating load, the absorbent solution can be circulated and the absorption heat pump 13 can be made to function without the use of a pump or the like. Consequently, the efficiency of the absorption heat pump 13 can be improved.

Returning to FIG. 1, the interior of the case 61 is divided by the dividing wall 62 into the first chamber 63 and the second chamber 64; the regenerator 23, the condenser 27, and the boiler 45 are disposed in the first chamber 63; and the evaporator 11 and absorber 12 are disposed in the second chamber 64.

The regenerator 23, the boiler 45, and other high-temperature devices, as well as the evaporator 11, the absorber 12, and other low-temperature devices are separated by the dividing wall 62, thereby impeding the transfer of heat from the high-temperature devices to the low-temperature devices, and therefore reducing heat loss. The devices can be operated efficiently because heat loss is reduced.

Figure 4:
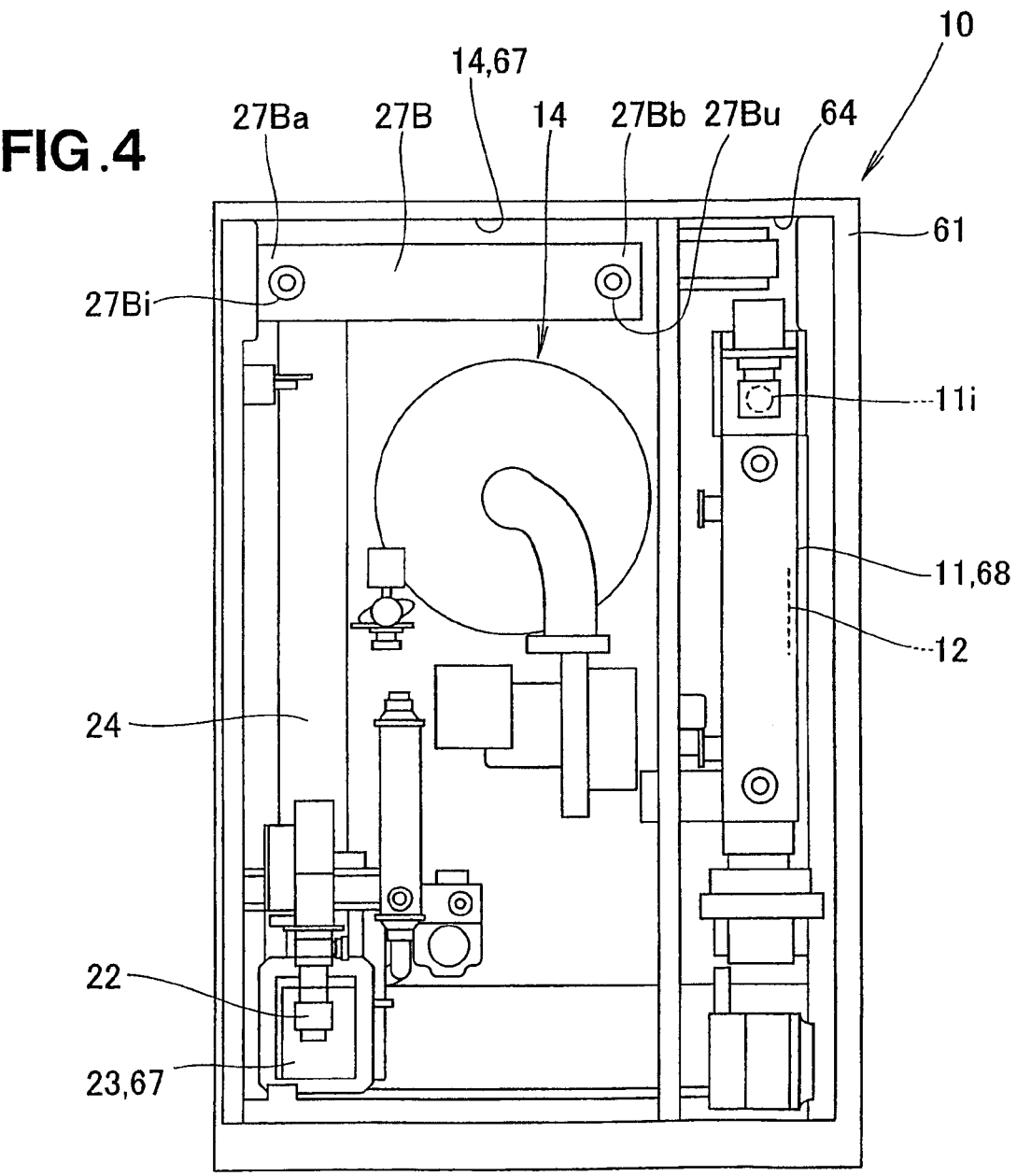
FIG. 4 is a front view of an absorption heat pump unit according to a second embodiment of the present invention.

FIG. 4 shows the absorption heat pump unit 10 of the second embodiment. In the absorption heat pump unit 10 of the second embodiment, the placement of the condenser 27B is different from that of the first embodiment.

The condenser 27B of the second embodiment has a rectangular parallelepiped shape that is longer in the longitudinal direction. The condenser 27B has a refrigerant inlet 27Bi at one end 27Ba in the longitudinal direction and a refrigerant outlet 27Bu at the other end 27Bb, and the refrigerant inlet 27Bi and refrigerant outlet 27Bu are disposed so as to be substantially horizontal.

If the refrigerant inlet 27Bi and the refrigerant outlet 27Bu are disposed so as to be substantially horizontal, the pressure difference in the refrigerant resulting from the height difference between the refrigerant outlet 27Bu of the condenser 27B and the refrigerant inlet 11i of the evaporator 11 can be made smaller than in cases in which the refrigerant inlet 27i and the refrigerant outlet 27u are not disposed so as to be substantially horizontal. The refrigerant can then be circulated even when the operating load is small and the pressure difference in the absorption heat pump 13 is small. Consequently, the efficiency of the absorption heat pump 13 can be improved.

In the embodiments, a unit capable of both supplying hot water and heating was presented, but cooling is also possible. In this case, cooling can be performed by switching a connection between a cold water circuit and a hot water circuit on the outside of the unit, connecting the cold water circuit to an indoor heat exchanger to guide cold water, and connecting the hot water circuit to a radiator or another heat-releasing device to guide hot water.

Furthermore, if some of the hot water is guided to the heat exchanger of a hot water storage tank during cooling, hot water can be supplied while cooling is performed.

Furthermore, in the embodiments, the absorbent solution outputted from the regenerator was drawn into the Venturi part, but the absorbent solution outputted from the regenerator may instead be drawn into the intake side of the circulation pump.

INDUSTRIAL APPLICABILITY

The present invention can be applied to an absorption heat pump unit for heating and supplying hot water.

The invention claimed is:

1. An absorption heat pump unit comprising:
   an evaporator that is configured to absorb heat from an external source and evaporate a refrigerant to create refrigerant vapor;
   an absorber that is configured to absorb the refrigerant vapor created by the evaporator into an absorbent solution;
   a regenerator that is configured to heat the absorbent solution created in the absorber to separate the refrigerant vapor from the absorbent solution;
   a rectifier that is configured to purify the refrigerant vapor separated in the regenerator;
   a condenser that is configured to condense the refrigerant vapor that has passed through the rectifier and release the heat to an exterior;
   a water supply tube configured to deliver water to the absorber and the condenser in order to cool the absorbent solution in the absorber and to recover the heat released to the exterior by the condenser; and
   a boiler disposed in a path of the water supply tube at a position downstream of the condenser to reheat hot water,
   wherein the absorption heat pump unit is covered by a case, the case having a dividing wall disposed vertically in the case and horizontally dividing an interior of the case into a first lateral chamber on a first lateral side of said dividing wall and a second lateral chamber on a second, opposite lateral side of said dividing wall,
   wherein the regenerator, the rectifier, the condenser and the boiler are disposed in the first lateral chamber, and the evaporator and the absorber are disposed in the second lateral chamber,
   wherein the rectifier is connected to a top end of the regenerator, the condenser is disposed on a first side of a top part of the rectifier, and the boiler is disposed in an upper part of the first lateral chamber and located adjacent to a second opposite side of the top part of the rectifier,
   wherein the regenerator comprises a first heating burner disposed in a lower part of the first lateral chamber and having a first capacity, the boiler comprises a second heating burner disposed in the upper part of the first lateral chamber, the second heating burner directly and solely reheating the hot water and having a second capacity, said second capacity being greater than the first capacity, and the first heating burner is disposed below and separate from the second heating burner,
   wherein the boiler is disposed above the regenerator in the first lateral chamber, and
   wherein the regenerator is disposed in the lower part of the first lateral chamber.

2. The heat pump unit of claim 1, wherein a pressure difference between a higher pressure and lower pressure in the heat pump unit is set as a first pressure difference, a pressure difference in the refrigerant resulting from a first height difference between a refrigerant outlet of the condenser and a refrigerant inlet of the evaporator is set as a second pressure difference, a pressure difference in the absorbent solution resulting from a second height difference between an absorbent solution outlet of the regenerator and absorbent solution inlet of the absorber is set as a third pressure difference, and the second pressure difference and the third pressure difference are designed so as to be less than the first pressure difference such that the pressure difference between the higher pressure and the lower pressure serves as a driving force to circulate refrigerant through the absorption heat pump unit.

3. The heat pump unit of claim 2, wherein the condenser has a refrigerant inlet and the refrigerant outlet, and the refrigerant inlet and the refrigerant outlet are disposed generally horizontally and at a same level as one another.

4. The heat pump unit of claim 1, wherein the absorber comprises:
   a bottom part that is configured to accumulate the absorbent solution;
   a top part that is configured to disperse the absorbent solution;
   an absorption supply tube that is configured to communicate absorbent solution between the bottom part and the top part; and a circulation pump, located in the path of the absorption supply tube, that is configured to pump the absorbent solution up to the top part,
wherein the absorber further comprises a Venturi part disposed in the path of the absorption supply tube and located on an output side of the circulation pump and a supply tube extending from an absorbent solution outlet formed in the regenerator is connected to the Venturi part.

\* \* \* \* \*